(12) United States Patent
Chan et al.

(10) Patent No.: US 8,316,668 B1
(45) Date of Patent: Nov. 27, 2012

(54) COMPOSITE MAGNETIC RECORDING MEDIUM

(75) Inventors: Richie Yuan Lin Chan, Air Itam (MY); Magenthiran Verapatran, Sungai Petani (MY); Mohamad Faisal Azmi, Serdang (MY); Beehuah Ong, Butterworth (MY)

(73) Assignee: WD Media, Inc., San Jose, CA (US)

( * ) Notice: Subject to any disclaimer, the term of this patent is extended or adjusted under 35 U.S.C. 154(b) by 30 days.

(21) Appl. No.: 12/889,130

(22) Filed: Sep. 23, 2010

(51) Int. Cl.
*C03B 27/04* (2006.01)
*C03B 27/044* (2006.01)

(52) U.S. Cl. .............. 65/114; 65/117; 65/29.19; 65/69; 65/95

(58) Field of Classification Search .............. None
See application file for complete search history.

(56) References Cited

U.S. PATENT DOCUMENTS

| | | | |
|---|---|---|---|
| 5,643,649 A * | 7/1997 | Hagan et al. | 428/64.1 |
| 5,654,057 A | 8/1997 | Kitayama et al. | |
| 5,681,609 A | 10/1997 | Kitayama et al. | |
| 5,733,622 A | 3/1998 | Starcke et al. | |
| 5,910,371 A | 6/1999 | Francel et al. | |
| 5,916,656 A | 6/1999 | Kitayama et al. | |
| 6,363,599 B1 | 4/2002 | Bajorek | |
| 6,395,634 B1 | 5/2002 | Miyamoto | |
| 6,673,474 B2 * | 1/2004 | Yamamoto | 428/846.9 |
| 6,801,397 B2 | 10/2004 | Yamamoto et al. | |
| 6,908,870 B2 | 6/2005 | Kawai | |
| 7,001,669 B2 | 2/2006 | Lu et al. | |
| 7,040,953 B2 | 5/2006 | Matsuno et al. | |
| 7,703,303 B2 | 4/2010 | Isono et al. | |
| 2003/0077982 A1 | 4/2003 | Takizawa | |
| 2003/0096078 A1 | 5/2003 | Horisaka et al. | |
| 2005/0096210 A1 | 5/2005 | Kawai | |
| 2005/0223744 A1 | 10/2005 | Horisaka et al. | |
| 2007/0039353 A1 | 2/2007 | Kamiya | |
| 2009/0104369 A1 | 4/2009 | Rajala et al. | |
| 2009/0118113 A1 * | 5/2009 | Yagi | 501/63 |

FOREIGN PATENT DOCUMENTS

KR 866844 B1 * 11/2008

OTHER PUBLICATIONS

Haldimann, "Structural Use of Glass", 2008, IABSE, pp. 9-12.*
Machine Translation of Korean Patent Document KR866844B1.*
Machine Translation of Korean Patent Document KR866844B1, Performed Mar. 2012.*

* cited by examiner

*Primary Examiner* — Matthew Daniels
*Assistant Examiner* — Lisa Herring

(57) ABSTRACT

A method for manufacturing glass hard disk substrates comprises annealing and then tempering previously formed glass hard disk substrates. The annealed and tempered glass hard disk substrates have improved strength and stress resistance without chemical treatments.

7 Claims, 4 Drawing Sheets

COMPOSITE MAGNETIC RECORDING MEDIUM

TECHNICAL FIELD

This invention relates to the field of disk drives and more specifically, to glass substrates for hard disk drives.

BACKGROUND

Glass hard disk substrates offer a variety of benefits as hard disk storage density increases. Benefits such as increased smoothness to allow lower flight height of magnetic read heads, increased strength and stiffness to allow faster rotational speed, and increased hardness to prevent deformation of the media if a head collision occurs. However, glass hard disk substrates are less fault tolerant and have less tolerance to physical stresses, such as bending, than their metal counterparts.

BRIEF DESCRIPTION OF THE DRAWINGS

The present invention is illustrated by way of example, and not limitation, in the figures of the accompanying drawings in which.

DETAILED DESCRIPTION

In the following description, numerous specific details are set forth, such as examples of specific layer compositions and properties, to provide a thorough understanding of various embodiment of the present invention. It will be apparent however, to one skilled in the art that these specific details need not be employed to practice various embodiments of the present invention. In other instances, well known components or methods have not been described in detail to avoid unnecessarily obscuring various embodiments of the present invention.

Embodiments of the present invention include glass hard disk substrates for magnetic recoding media. The glass hard disk substrates are annealed and tempered, forming glass substrates that are stronger than hard disk substrates manufactured with annealing alone or with chemical strengthening. Furthermore, the annealing and tempering process reduces the number of glass substrate defects during manufacture.

Figure 1:
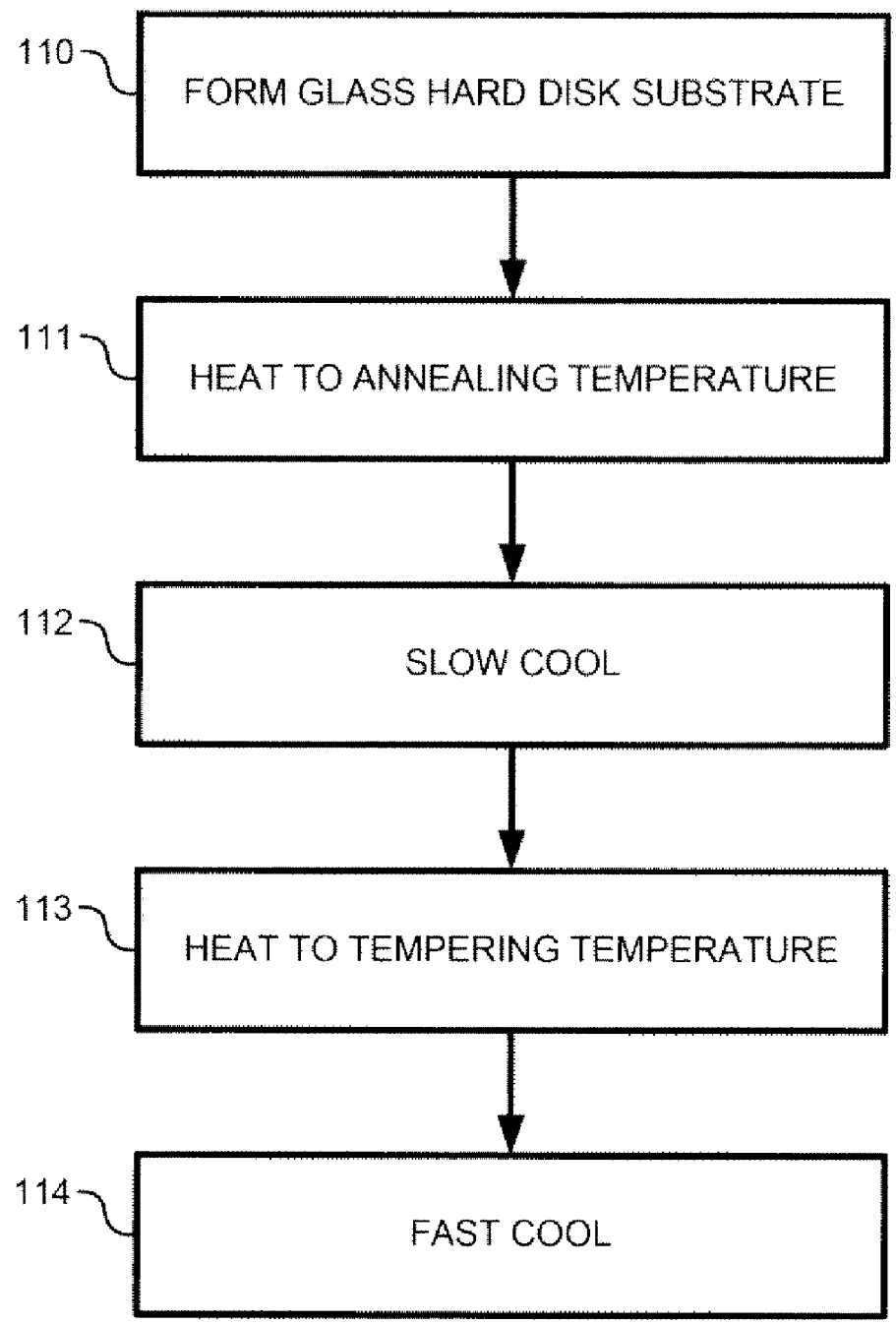
FIG. 1 illustrates a method implemented in accordance with an embodiment of the invention.

FIG. 1 illustrates a method implemented in accordance with an embodiment of the invention. In step 110 an initial glass hard disk substrate is formed. In some embodiments, this may comprise forming a borosilicate glass hard disk substrate with a traditional float glass method. In this method, sheet glass is formed using a tin float. The sheet glass is then scribed to form squares, which are cut into disks. After a central region of the disks are removed to form the substrate's inner diameter, the disks are polished. In some embodiments, initial treatments, such as an application of colloidal silica followed by an initial annealing process, may be applied.

In step 111, the formed hard disk substrates are heated to an annealing temperature. The annealing temperature may be selected to be a temperature below the softening point of the formed glass hard disks but sufficiently high to allow the hard disks to relieve their internal stresses. Once the disk are heated to the annealing temperature, they are allowed to soak at the annealing temperature. The annealing allows the glass hard disks to relieve internal stresses formed during the cutting and polishing steps. In step 112, the annealed glass hard disks are slowly cooled to room temperature. In some embodiments, the cooling rate is selected to prevent thermal stresses from being introduced into the hard disk substrates. After this annealing process, glass hard disk substrates have an isotropic internal structure in which the internal stresses in the reduced or eliminated.

The annealed glass substrates are then subjected to a tempering process. In step 113, the annealed glass substrates are heated to a tempering temperature. In some embodiments, the tempering temperature may be near or above the softening point of the glass substrates, to allow a internal region near the surface of the glass substrates to undergo softening while still maintaining the shape of the glass hard disk substrates. After the glass substrates have been maintained at the tempering temperature for a predetermined soak time, the glass substrates are quickly cooled in step 114. The fast cooling step is configured to form a tempered internal structure in the glass hard disk substrate. The rapid cooling results in the surface regions of the glass substrates cooling faster than the internal regions of the glass substrates. This causes compressive stresses in the surface regions and tensile stresses in the internal regions. These stresses must be overcome before tensile stresses can act on the surface regions, creating a stronger substrate with increased bending resistance.

Figure 2:
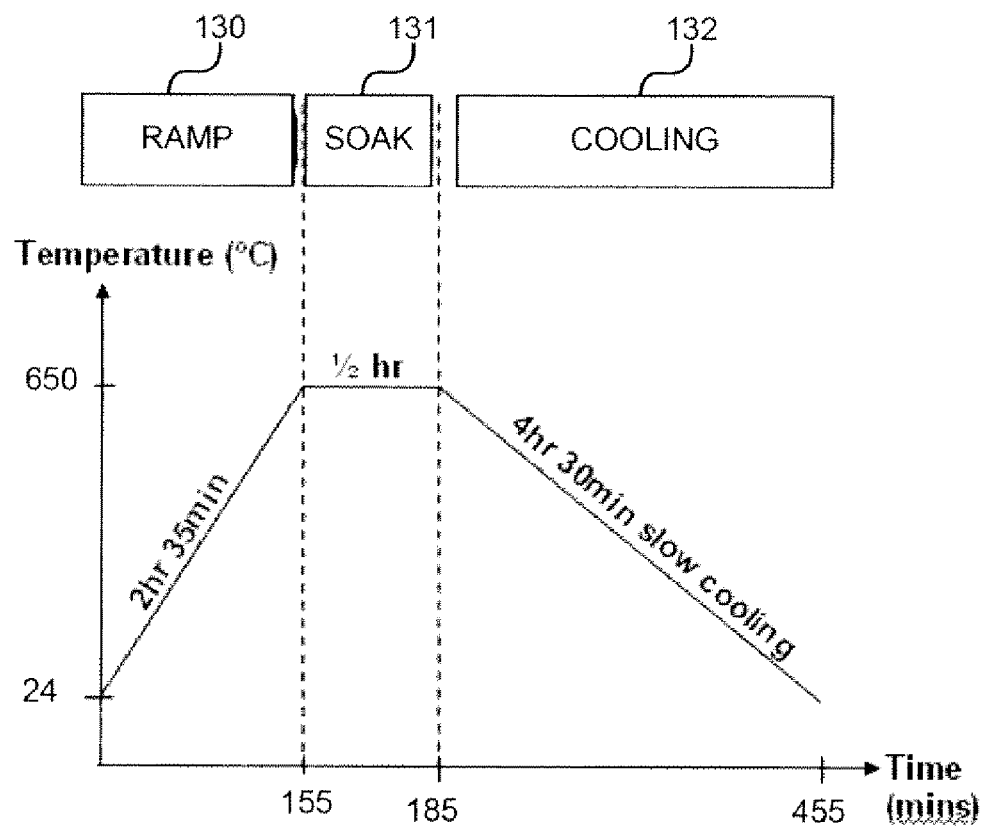
FIG. 2 illustrates an annealing process implemented in accordance with a particular embodiment of the invention.

FIG. 2 illustrates an annealing process implemented in accordance with a particular embodiment of the invention. In this embodiment, annealing comprises ramping up 130 a batch of glass hard disk substrates to an annealing temperature. In the illustrated embodiment, the glass hard disk substrates comprise borosilicate glass having a softening temperature around 670° C. and the oven used for heating has about a 5° C./min heating rate. Here, a ramp time of 2 hr 35 min to reach an annealing temperature of 650° C. allows the internal stresses the glass hard disk substrates to relax without softening the substrates. In other embodiments, different glass types, heating rates and annealing temperatures may be employed.

After ramping 130, the batch of glass substrates is soaked 131 at the annealing temperature for a first amount of time. In the illustrated embodiment, maintaining the glass substrates at the annealing temperature for 30 min allows the internal stresses of the glass substrates to be sufficiently reduced. However, in other embodiments, longer or shorter soak times may be employed.

After soaking 131, the batch of glass hard disk substrates is allowed to cool 143 to room temperature. In the illustrated embodiment, the batch of glass hard disk substrates are cooled at a rate of about 2.3° C./min for a total cooling time of about 4 hr 30 min. For example, the slow cooling may be achieved by turning the heating oven off and allowing the oven as a whole to cool to room temperature. In other embodiments, longer or slower cooling times may be employed, and the cooling rate may be more tightly controlled.

Figure 3:
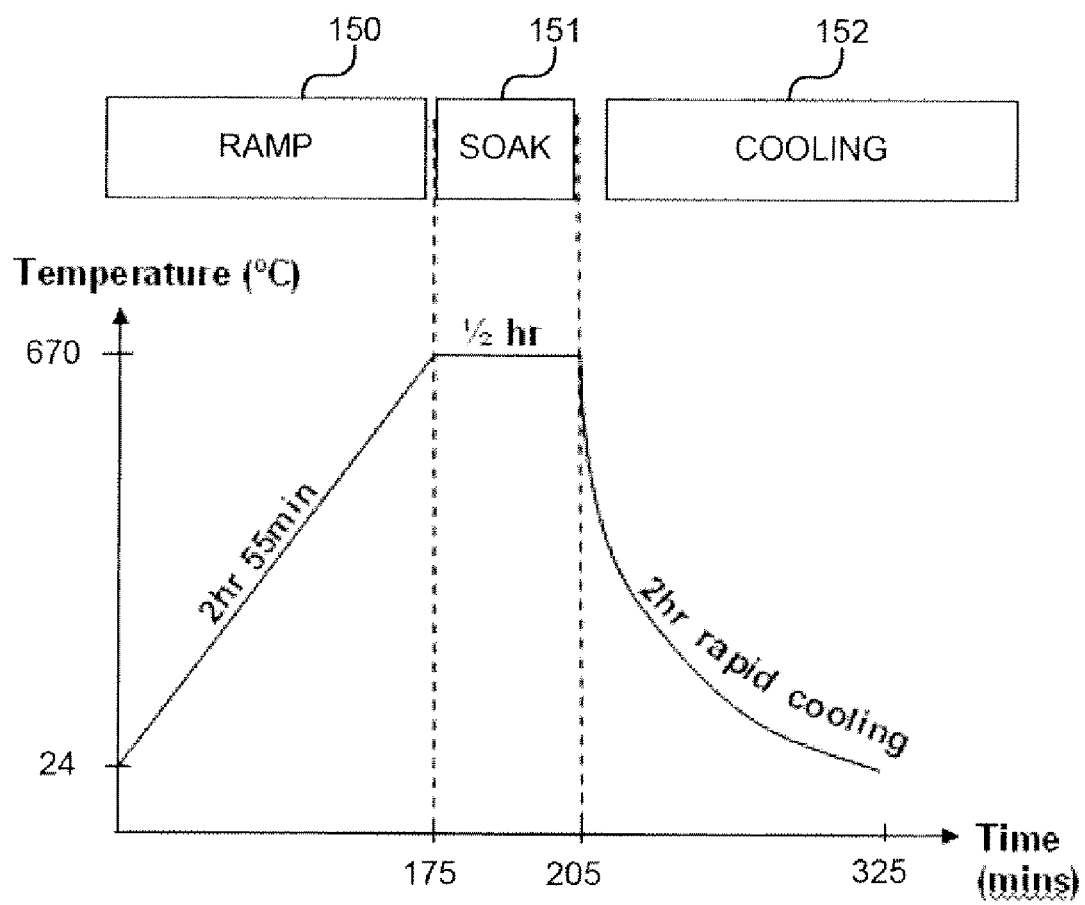
FIG. 3 illustrates a tempering process implemented in accordance with a particular embodiment of the invention.

FIG. 3 illustrates a tempering process implemented in accordance with a particular embodiment of the invention. During the tempering process, a batch of annealed glass hard drive substrates, such as the same batch from an immediately preceding annealing process, are subjected to a tempering heat treatment. In step 150, the batch of glass substrates is ramped up to a tempering temperature. In the illustrated embodiment a ramp time of about 3 hours at about 3.6° C./min is sufficient to heat the substrates to the tempering temperature. In some embodiments, the tempering temperature is about or near the softening temperature of the glass used in the glass substrates. For example, in the illustrated embodiment, the tempering temperature is 670° C. In this embodiment, 670° C. is sufficiently hot to allow tempering to occur without deformation of the hard disk substrates. In other embodiments, different glass types, heating rates and tempering temperatures may be employed.

After ramping 150, the batch of glass hard drive substrates is allowed to soak 151 at the tempering temperature for a predetermined length of time. In the illustrated embodiment, with borosilicate glass and a tempering temperature of 670° C. a 30 min heat soak is sufficient to obtain a liquidus internal state for the hard disk substrates. However, in other embodiments, longer or shorter soak times may be employed.

After soaking 151, the batch of glass hard disk substrates are rapidly cooled 152. In some embodiments, the cooling is configured such that a surface region of the glass hard disk substrate enters a solidus state before an inner region of the glass hard disk substrate. This rapid cooling, or quenching, freezes the hard disk substrates in the tempered state with compressive stresses in the surface regions and tensile stresses in the internal regions. In some embodiments, the cooling 152 is achieved by blowing air over the batch of hard disk substrates at a controlled rate to rapidly cool the hard disk substrates. As illustrated, in some embodiments the cooling rate may be non-linear to provide a more rapid cooling rate initially, followed by a slower cooling rate once the hard disk substrates have been frozen in the tempered state. In particular embodiments, the hard drive substrates are processed in batches comprising columnar stacks of substrates. Rapid cooling the hard drive substrates comprising forcing air through the void created by the inner diameter of the columnar stack at a different rate than the flow rate over the outer diameter of the columnar stack. The different air flow rates are configured such that the inner circumferential region of the hard disk substrates cools at substantially the same rate as the outer circumferential region of the substrates.

Figure 4:
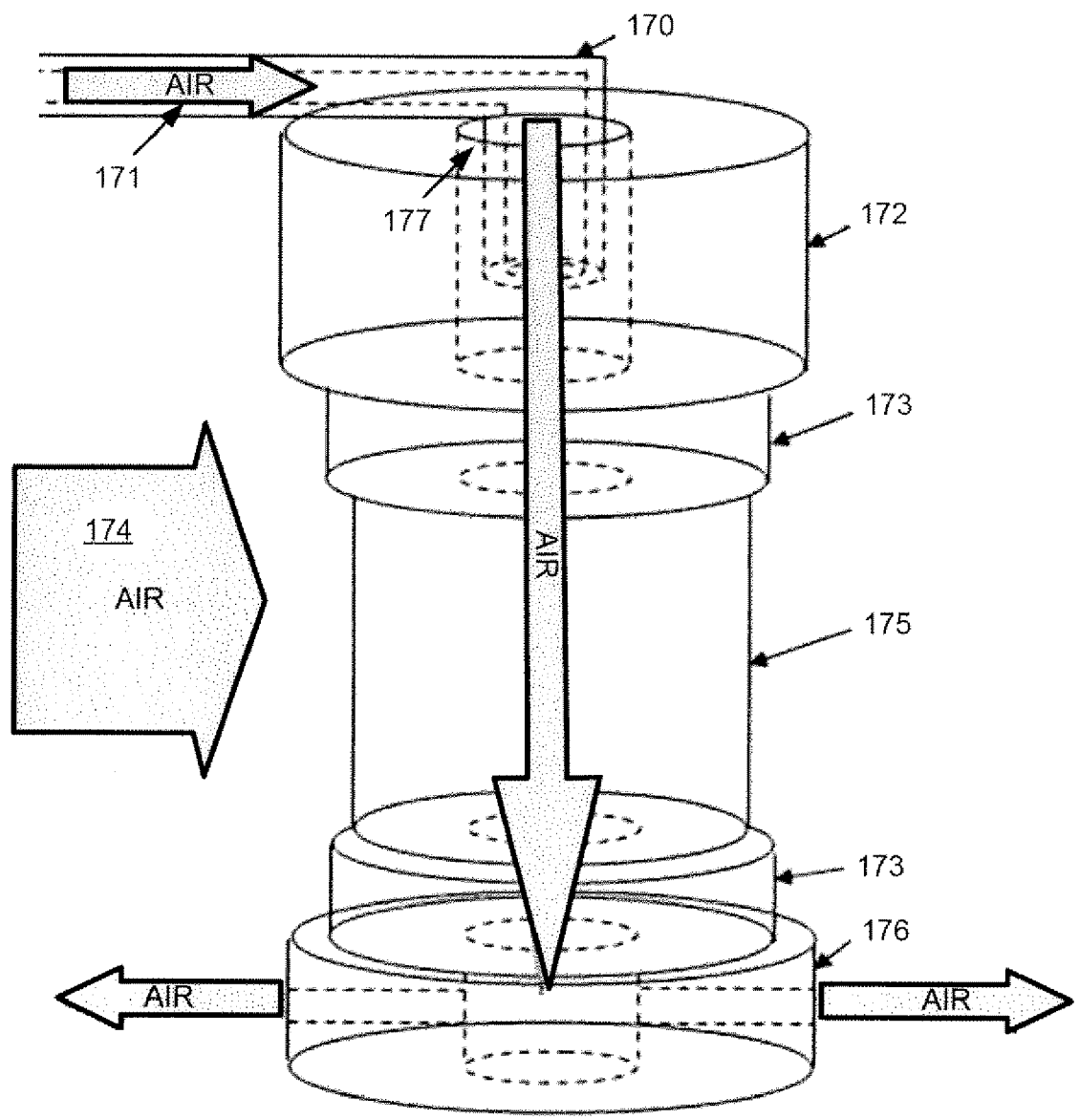
FIG. 4 illustrates a system for tempering batches of glass hard disk substrates implemented in accordance with an embodiment of the invention.

FIG. 4 illustrates a system for tempering batches of glass hard disk substrates implemented in accordance with an embodiment of the invention. In the illustrated embodiment, glass hard disk substrates are processed as a columnar stack 175 of substrates. In some embodiments, the number of substrates may be between about 80-150 substrates, with particular embodiments having about 100 substrates. The columnar stack of substrates is bordered by two optical flats, 173, with holes formed in them corresponding to the inner circumference of the glass substrates 175. A weight 172 provides some compressive force during processing, for example a 3 kg weight provides about 30 N of compressive force on the axis of columnar stack 175. The weight also has a hole corresponding to the inner circumference of the glass substrates 175. A base 176 for the stack 175, flats 173, and weight 172 to rest on is provided. A pipe 170 is fitted into the hole 177 in the upper weight 172. Air 171 is forced through the pipe 170, down through the columnar stack 174, and out the base 176. Simultaneously air 174 flows over the outer circumference of the stack 175. As described above, in some embodiments the air flow of air 171 and air 174 are different and selected to allow the inner circumferential regions of the stack 175 to cool at substantially the same rate as the outer circumferential regions of the stack 175. In some embodiments, air 171 and 174 may be room temperature air, or may be hotter or cooler than room temperature to implement the tempering process. In still further embodiments, air 171 and 174 may be different temperatures to allow the inner circumferential regions of the stack 175 to cool at substantially the same rate as the outer circumferential regions of the stack 175.

In the foregoing specification, embodiments of the invention have been described with reference to specific exemplary features thereof. It will, however, be evident that various modifications and changes may be made thereto without departing from the broader spirit and scope of the invention as set forth in the appended claims. The specification and figures are, accordingly, to be regarded in an illustrative rather than a restrictive sense.

What is claimed is:

1. A method for treating a glass hard disk substrate, comprising:
    obtaining a formed glass hard disk substrate;
    annealing the formed glass hard disk substrate to form an annealed glass hard disk substrate by ramping up the formed glass hard disk substrate to an annealing temperature, maintaining the glass hard disk substrate at the annealing temperature for a first amount of time, and cooling the glass hard disk substrate at a first cooling rate; and
    tempering the annealed glass hard disk substrate to form a tempered and annealed glass hard disk substrate by ramping up the annealed glass hard disk substrate to a tempering temperature, maintaining the glass hard disk substrate at the tempering temperature for a second amount of time, and cooling the glass hard disk substrate at a second cooling rate,
    wherein the formed glass hard disk substrate is one of a plurality of formed glass hard disk substrates forming a columnar stack of glass hard disk substrates; and
    wherein the step of cooling the glass hard disk substrate at the second cooling rate comprising cooling the stack of glass hard disk substrates by flowing air over an outer circumference of the stack of glass hard disk substrates at a first air flow rate and by flowing air over an inner circumference of the stack of glass hard disk substrates at a second air flow rate.

2. The method of claim 1, wherein the second cooling rate is greater than the first cooling rate.

3. The method of claim 2, wherein the tempering temperature and the second amount of time are selected such that the glass hard disk substrate[s] enters a liquidus state during the step of maintaining the glass hard disk substrate at the tempering temperature for the second amount of time; and wherein the second cooling rate is such that a surface region of the glass hard disk substrate enters a solidus state before an inner region of the glass hard disk substrate.

4. The method of claim 3,
    wherein the first air flow rate and the second air flow rate are configured such that an outer circumferential region of the stack of glass hard disk substrates cools at substantially the same rate as an inner circumferential region of the stack of glass hard disk substrates.

5. The method of claim 1, wherein the glass hard disk substrate comprises borosilicate glass, wherein the annealing temperature is between about 645° C. and about 655° C., wherein the tempering temperature is between about 665° C. and about 675° C., wherein the first cooling rate cools the glass hard disk substrate to room temperature in at least about 4 hours, and wherein the second cooling rate cools the glass hard disk substrate to room temperature in at most about 2.5 hours.

6. The method of claim 5, wherein the first air flow rate and the second air flow rate are configured such that an outer circumferential region of the stack of glass hard disk substrates cools at substantially the same rate as an inner circumferential region of the stack of glass hard disk substrates.

7. The method of 6, wherein the columnar stack of glass hard disk substrates is axial compressed with a force of about 30 N.

* * * * *